United States Patent [19]

Zwick

[11] 4,301,108

[45] Nov. 17, 1981

[54] PROCESS FOR MELT-SPINNING TRANSPARENT ACRYLONITRILE POLYMER FIBER FROM A HYDROPHOBIC POLYMER

[75] Inventor: Maurice M. Zwick, Stamford, Conn.

[73] Assignee: American Cyanamid Company, Stamford, Conn.

[21] Appl. No.: 147,807

[22] Filed: May 8, 1980

[51] Int. Cl.$^3$ .............................................. D01F 7/00
[52] U.S. Cl. .......................... 264/206; 260/29.6 AN; 264/210.6; 264/342 RE
[58] Field of Search ...................... 264/182, 210.6, 206, 264/342 RE; 260/29.6 AN

[56] References Cited

U.S. PATENT DOCUMENTS

| | | | |
|---|---|---|---|
| 3,029,218 | 4/1962 | Murdock et al. | 264/182 |
| 3,029,219 | 4/1962 | Murdock et al. | 264/182 |
| 3,029,220 | 4/1962 | Murdock et al. | 264/182 |
| 3,036,032 | 5/1962 | Murdock et al. | 264/182 |
| 3,036,033 | 5/1962 | Murdock et al. | 264/182 |
| 3,104,934 | 9/1963 | Blumenkopf | 264/182 |
| 3,133,135 | 5/1964 | Ogle | 264/182 |
| 3,140,265 | 7/1964 | Richter et al. | 264/182 |
| 3,522,141 | 7/1970 | D'Alelio | 264/182 |
| 3,873,508 | 3/1975 | Turner | 264/182 |
| 3,896,204 | 7/1975 | Goodman et al. | 264/211 |
| 4,062,857 | 12/1977 | Kobashi et al. | 264/206 |
| 4,108,818 | 8/1978 | Odawara et al. | 264/206 |
| 4,163,770 | 8/1979 | Povoroff | 264/206 |
| 4,224,210 | 9/1980 | Cazzaro et al. | 264/182 |

FOREIGN PATENT DOCUMENTS 51-60734  5/1976  Japan.

Primary Examiner—Jay H. Woo
Attorney, Agent, or Firm—Frank M. Van Riet

[57] ABSTRACT

Incorporation of an N-vinylamide and polymerization initiator into a single phase fusion melt of a hydrophobic acrylonitrile polymer and water and polymerization of said monomer in situ provides a stable, transparent acrylonitrile polymer shaped article when said melt is extruded directly into a steam-pressurized solidification zone in which it is stretched, followed by drying under controlled conditions of temperature and humidity.

4 Claims, No Drawings

PROCESS FOR MELT-SPINNING TRANSPARENT ACRYLONITRILE POLYMER FIBER FROM A HYDROPHOBIC POLYMER

This invention relates to a process for increasing the hydrophilicity of a fiber-forming acrylonitrile polymer while said polymer is being processed into shaped articles by extrusion of a fusion melt of said polymer and water. More particularly, this invention relates to such a process wherein a fiber-forming acrylonitrile polymer of little or no hydrophilicity is prepared as a fusion melt with water, a hydrophilic monomer and a polymerization initiator in a compacting and melting zone which provides the melt at a temperature above the boiling point of water at atmospheric pressure, and at a pressure at least equal to the autogenous pressure, the hydrophilic monomer being polymerized in conjunction with said melt preparation, and the resulting melt is extruded through a spinneret directly into a steam-pressurized solidification zone maintained under conditions of saturation, the pressure, and temperature of which control the rate of release of water from the nascent extrudate and maintain the extrudate in stretchable state.

Recent developments in the field of spinning acrylonitrile polymer fiber have led to a melt spinning process wherein a single phase fusion melt of acrylonitrile polymer and water is extruded through a spinneret directly into a steam-pressurized solidification zone maintained under conditions which control the rate of release of water from the nascent extrudate, and the extrudate is stretched for orientation purposes while it remains within the solidification zone, (see U.S. Pat. No. 4,163,770 issued Aug. 7, 1979 to H. Porosoff).

In a further development relating to the melt-spinning of a fusion melt of an acrylonitrile polymer and water, it was found that by using a sufficiently hydrophilic acrylonitrile fiber-forming polymer, the resultant fiber upon drying under suitable conditions of wet-bulb and dry-bulb temperatures possesses a high degree of transparency as indicated by dye intensity and absence of shade change due to hot-wet processing; (see U.S. Pat. Application Ser. No. 895,576 filed Apr. 12, 1978 by W. E. Streetman et. al.)

Unfortunately, many fiber-forming acrylonitrile polymers that are used in the preparation of fiber by various procedures are not hydrophilic in nature or contain insufficient hydrophilicity to provide transparent fiber when spun by way of single phase fusion melt extrusion. This necessitates preparation of special polymer compositions as described by Streetman et al. and does not allow for utilization of those acrylonitrile polymers that are desirably useful in other spinning procedures. What is needed, therefore, is a process that would enable hydrophobic acrylonitrile polymers or acrylonitrile polymers of low hydrophilicity to be processed by single phase fusion melt extrusion procedures to provide substantially transparent fiber. Such a provision would fulfill a long-felt need and constitute a significant advance in the art.

In accordance with the present invention, there is provided a fusion melt comprising from about 70 to about 90 parts of a hydrophobic fiber-forming acrylonitrile polymer, from about 10 to about 30 parts of water, from about 3 to about 25 parts of an N-vinylamide of the structure:

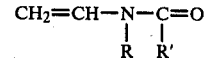

wherein R represents a methyl group, R' represents hydrogen or a methyl group or R and R' are linked together to form part of a ring structure, the segment containing 3 to 5 carbon atoms, all of these N-vinyl monomers being water soluble below 120° C., and uniformly dispersed in said melt is an effective amount of a polymerization initiator, said melt being at a temperature above the boiling point of water at atmospheric pressure, and at a pressure sufficient to maintain water in liquid state, the amounts of polymer and water in said melt being such that they form a single phase melt.

In accordance with an alternative aspect of the present invention, there is provided a process for preparing a substantially transparent shaped article from a hydrophobic fiber-forming acrylonitrile polymer which comprises preparing in a compacting and melting zone a fusion melt of about 70 to 90 parts of a hydrophobic fiber-forming acrylonitrile polymer, from about 10 to about 30 parts of water, from about 3 to about 25 parts of an N-vinylamide of the structure:

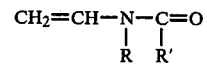

wherein R represents a methyl group, R' represents hydrogen or a methyl group or R and R' are linked together to form part of a ring structure, the segment containing 3 to 5 carbon atoms, all of these N-vinyl monomers being water soluble below 120° C., and uniformly dispersed in said melt is an effective amount of a polymerization initiator, said melt being at a temperature above the boiling point of water at atmospheric pressure, and at a pressure sufficient to maintain water in liquid state, the amount of polymer and water in said melt being such that they form a single phase melt; converting a major portion of the monomer content of said melt to polymer while said melt remains within said compacting and melting zone; extruding the polymerized melt through a spinneret directly into a steam-pressurized solidification zone maintained under conditions of saturation, the pressure and temperature of which control the rate of release of water from the nascent extrudate and maintain said extrudate in a stretchable state; stretching said extrudate while it remains within said solidification zone to provide polymer orientation; exiting said stretched extrudate into the atmosphere; and drying the resulting extrudate at a dry-bulb temperature in the range of about 110° C. to 180° C. and at a wet-bulb temperature in the range of about 60° C. to 100° C.

In accordance with another alternative aspect of the present invention there is provided a substantially transparent acrylonitrile polymer shaped article obtained by melt extruding a fusion melt of a hydrophobic fiber-forming acrylonitrile polymer and water also containing an N-vinylamide and polymerization initiator under conditions such that a hydrophilic fiber-forming polymer is formed and a substantially transparent shaped article is obtained.

The process of the present invention by use of the N-vinylamide modified fusion melt provides a fiber-forming polymer composition that obtains during processing sufficient hydrophilicity to provide a substantially transparent acrylonitrile polymer shaped article whereas when otherwise processed by fusion melt spinning the initial acrylonitrile polymer is incapable of providing substantially a permanently transparent shaped article. In addition, the resulting shaped article by virtue of the increased hydrophilic nature of the fiber-forming polymer has desirable properties associated with the hydrophilic monomer content added to the polymer composition. A further benefit arising from the monomer content in the initial fusion melt is a melting point depression thereof which enables processing to be accomplished at lower temperatures and pressures.

In carrying out processing in accordance with the present invention, a fusion melt is prepared following prior art procedures except that additional ingredients are present in the melt. The melt composition will contain from about 70 to about 90 parts of polymer and, correspondingly, from about 30 to about 10 parts of water, all parts being by weight. In this range of weight proportions, the polymer and water will form a single phase melt, i.e., there will be no separate phases of unmelted polymer or of excess water. Also contained in the melt composition is a N-vinylamide content of about 3 to 25 parts, depending upon the nature of the acrylonitrile polymer employed and the degree to which increased hydrophilicity is desired. There will also be present in the melt composition a sufficient amount of a polymerization initiator to effect polymer conversion of a major amount of the N-vinylamide present.

The acrylonitrile polymer employed as the starting fiber-forming polymer is one containing at least about 80 weight percent of acrylonitrile and any balance of one or more monomers copolymerizable with acrylonitrile. The acrylonitrile polymer will be a polymer that is hydrophobic or is of insufficient hydrophilicity to provide a substantially transparent fiber when spun by the process of single phase fusion melt extrusion. By "substantially transparent", as that term is employed herein and in the appended claims, is meant that a fiber resulting has a dye intensity of at least about 60 and a shade change due to hot-wet processing of less than about 15. Thus, while the acrylonitrile polymer may contain small proportions of hydrophilic units in its composition, such content will necessarily be less than that amount necessary to provide a substantially transparent fiber when spun by single phase fusion melt extrusion.

The N-vinylamide useful in the process of the present invention has the structure:

$$CH_2=CH-\underset{R}{N}-\underset{R'}{C}=O$$

wherein R represents a methyl group, R' represents hydrogen or a methyl group or R and R' can be linked together to form part of a ring structure, the segment containing from 3 to 5 carbon atoms. All of these monomers are water soluble below 120° C. Typical N-vinylamides include, for example, the following.

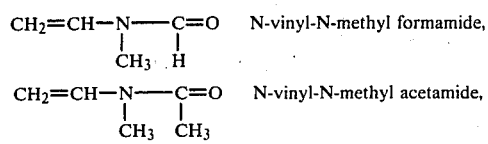

N-vinyl-N-methyl formamide,

N-vinyl-N-methyl acetamide,

-continued

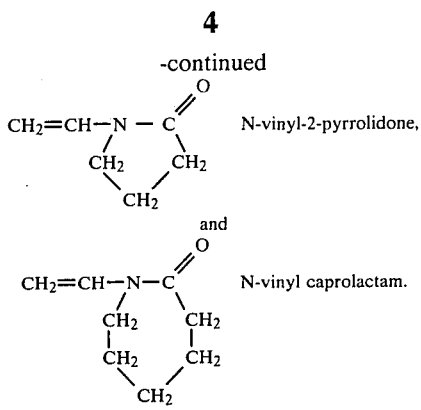

N-vinyl-2-pyrrolidone, and

N-vinyl caprolactam.

These and other N-vinylamides falling within the structural limitations given may be used alone or in mixture with one another in a total amount as given above. The N-vinylamide will form part of the single phase melt formed by the polymer-water composition and will lower the melting point thereof.

In addition to the content of N-vinylamide as specified, other vinyl monomers may also be present in the melt, if desired. Such other monomers, which may or may not form part of the single phase of polymer and water, may be used to obtain addition modification of the polymer composition for fiber property benefits. Suitble additional monomers include, for example, acrylonitrile, vinylene carbonate, methyl acrylate, methylmethacrylate, styrene and the like. These optional monomers when employed will usually be present in an amount less than that of the N-vinylamide. Optionally, there may also be present a certain amount of a water-soluble polymer such as polyethylene glycol or polyvinyl alcohol.

Also present in the fusion melt will be a polymerization initiator in an amount which is sufficient to effect polymerization of a major amount of the monomer content of the fusion melt. Any known initiator-catalyst used in free radical polymerization may be used, such as azo compounds, peroxides, hydroperoxides, or redox systems such as the persulfate-bisulfite type and others. If the initial polymer is a graft of acrylonitrile on polyvinyl alcohol or other polyol, polymerization can also be initiated by cerium salts and other similar transition metal salts. The preferred initiators, however, are those that have a half-life of about 5 minutes at a temperature in the range of about 120° C. and 140° C. since such initiators ensure that a major amount of the monomer content will be polymerized during melt formation in the compacting and melting zone. Typically, the preferred are illustrated by 1,1-ditertiary butyl peroxy-3,3,5 trimethyl cyclohexane; tertiary butyl peroxy benzoate; tertiary butyl peroxy acetate, and the like, all of which are commercially available. The amount of initiator to be used will generally be in the range of about 0.5 to 3.0 weight percent based on the weight of the polymerizable monomer content. The polymerization initiator should be uniformly dispersed throughout the fusion melt and may form a separate phase therein depending upon its chemical nature.

The polymer, water, monomer, and polymerization initiator are mixed and fed to a compacting and melting zone in which the desired fusion melt is to be formed. Typically, such a compacting and melting zone is that of a screw extruder which operates at the necessary temperature and pressure, usually at least the autogenous pressure. The operating conditions of the extruder should be such that at least aout 50% and preferably at least 80% of the monomer content of the fusion melt composition is polymerized by the time the melt is extruded through the spinneret into the steam-pressurized solidification zone. Proper conditions for processing depend upon many variables including monomer reactivity, temperature-residence time profile, shear rate, amount of water present, melt viscosity, and others. However, process conditions necessary can readily be determined by trial using the accompanying examples as guides.

After the fusion melt is prepared and the monomer content therein has polymerized to a major degree, i.e., at least about 50%, the melt is extruded through a spinneret assembly having a fiber-making spinneret or a film-producing die directly into a steam-pressurized solidification zone maintained under conditions of saturation, the pressure and temperature which control the rate of release of water from the nascent extrudate and maintain the extrudate in stretchable state. It is generally preferable to employ saturated steam in the solidification zone at a pressure which provides a temperature which is below the melting point of the polymer-water melt but generally not more than about 50° C. below said melting point. Usually the temperature is about 30° C. below the polymer-water melting point and may be as much as about 50° C. below said melting point so long as the nascent extrudate remains in stretchable state. The melting point of the polymer-water composition specified is that obtained when the composition is free of added monomer and polymerization initiator.

While the nascent extrudate remains within the solidification zone and is in stretchable state, it is subjected to stretching to orient the polymer molecules and improve the physical properties of the shaped article. In processing fiber, the extrudate is oriented in the longitudinal direction at suitable stretch ratios to provide desirable fiber properties, usually at stretch ratios of at least about 10, preferably at least 25 or more. Such stretching may be accomplished in one or more stages. In processing film, it is generally preferred to provide biaxial stretching, stretching in the machine direction being accomplished by drawing and stretching in the transverse direction being accomplished by blowing compressed air or steam into the hollow tube provided by the circular film-forming die. It is generally desirable to effect such biaxial stretching at stretch ratios of at least about 2 in each direction although greater stretch ratios are preferred. Usually, but not necessarily, the stretch ratio in both the machine and transverse directions will be approximately the same.

After the extrudate has been stretched as indicated, it exits from the solidification zone into the atmosphere. The exited extrudate will contain residual water which must be removed therefrom under specified conditions of dry-bulb and wet-bulb temperatures. The extrudate may be stored in vapor-tight containers until such drying is conducted or it may be processed directly to such drying conditions. Drying is conducted under conditions generated by dry-bulb temperatures in the range of about 110° C. to 180° C. and wet bulb temperatures in the range of about 60° C. to 100° C.

After the extrudate is dried as indicated, processing in accordance with the present invention is complete although it may be desirable to conduct certain additional optional processing steps, particularly when the shaped article is a fiber. In such case, it is generally desirable to relax the dried fiber in steam or boiling water to effect fiber shrinkage in the range of about 15 to 40% since such processing generally achieves a more favorable balance of physical properties than when such additional processing is omitted.

After polymerization of the monomer content in conjunction with compacting and melting, the polymerized components may exhibit essentially three forms: (1) that of a linear polymer or copolymer; (2) that of chains grafted onto the backbones of the fiber-forming acrylonitrile polymer employed; and (3) that of block copolymers resulting from radicals that have formed as a result of shear fracture of polymer chains of the fiber-forming acrylonitrile polymer. Generally all three forms are present in the resulting extrudate to some extent, although one or another of these forms may dominate depending upon the nature of the monomer, of the polymer, of the polymerization initiator, of the processing conditions, and the like. It is only necessary, however, that the resulting extrudate be of a composition that is increased in hydrophilicity over that of the starting acrylonitrile polymer to derive the benefits of the present invention.

The invention is more fully illustrated in the examples which follow wherein all parts and percentages are by weight unless otherwise specified.

COMPARATIVE EXAMPLE A

A polymer composed of 89.3% acrylonitrile and 10.7% of methyl methacrylate and having a weight average molecular weight of 56,000 is employed as the fiber-forming polymer. 84 parts of the dry polymer and 16 parts of water are fed to a screw extruder having a screw of length/diameter ratio of 30. The extruder has a temperature profile which rises from about 120° C. near the feed section to 172° C. in the spinneret assembly at the end of the extruder. The polymer-water mixture is melted and formed as a single phase melt by the extrudate over a residence time therein of about seven minutes.

The melt is then extruded through a spinneret assembly having an orifice plate containing a plurality of orifices, each of 100 micron diameter. Extrusion is directly into a steam-pressurized solidification zone maintained with saturated steam at a temperature of 118° C. While the extrudate remains within the solidification zone it is stretched in two stages to provide polymer orientation, the first stage being conducted at a stretch ratio of 3.4 relative to the linear flow of melt through the spinneret and the second stage at a stretch ratio of 10 to provide a total stretch ratio of 34. The stretched fiber is then exited from the solidification zone by way of a vane seal and dried at controlled humidity using a dry-bulb temperature of 127° C. and a wet-bulb temperature of 65° C. to obtain a collapsed transparent fiber.

The fiber obtained is then subjected to relaxation in steam at 120° C. to effect a shrinkage of 30%. The denier of the fiber after relaxation is 3. After steam relaxation, however, the fiber is found to have redeveloped void structure, indicating that it is not stable to hot-wet processing and is not transparent at this point in processing. When this steam-relaxed fiber is again dried under the controlled humidity conditions given above, its structure is again collapsed and it appears transparent. However, when the fiber is subjected to boil-off or dyeing, the void structure again appears and an opaque fiber is produced.

COMPARATIVE EXAMPLE B

The procedure of Comparative Example A is again followed except that the extruder feed consists of 84 parts of the polymer of Comparative Example A, 16 parts of water, and 9 parts of poly(vinylpyrrolidone) of an average molecular weight of 40,000.

During steam relaxation and boil-off of the fiber, void structure develops and the fiber obtained is opaque. Although poly(vinylpyrrolidone) is known to act as a structure stabilizer for acrylic and modacrylic fibers in spinning procedures wherein a polymer solvent is employed, it is not effective in this example apparently because poly(vinylpyrrolidone) has a negative solubility-temperature dependence and precipitates out of solution above 100° C.

EXAMPLE 1

The general procedure of Comparative Example A is again followed except that the extruder feed consists of 84 parts of the polymer of Comparative Example A, 16 parts of water, 9 parts of N-vinyl pyrrolidone and 0.35 part of tertiary butyl peroxy benzoate. Using power tracings to measure the electrical input necessary to drive the extruder screw during processing to provide the fusion melt, it is found that considerably less shear work than in Comparative Example A or B is necessary to provide the melt of the present example. This is due to the addition of the melting point depression effected by the added monomer and the initial dilution of the polymer.

The fiber which results has a stable, collapsed transparent structure and no evidence of void structure or opacity is noted after steam relaxation or boil off. Carbon and nitrogen analyses of the resulting fiber indicate that the major proportion, i.e., greater than 50%, of the N-vinyl pyrrolidone is polymerized during processing and becomes part of the fiber.

EXAMPLE 2

The procedure of Example 1 is again followed. The extruder feed consists of 85 parts of the same polymer used in Example 1, 15 parts of water, 9 parts of N-vinyl-pyrrolidone, 6 parts of acrylonitrile and 0.8 part of tertiary butyl peroxy benzoate. The temperature at the spinneret is 168° C.

The resulting fiber as it emerges from the solidification zone is dried at a dry-bulb temperature of 115° C. and a wet-bulb temperature of 75° C. The fiber is transparent and its structure is stable to steam relaxation and boil-off.

EXAMPLE 3

The procedure of Example 1 is again followed except that the polymer is a homopolymer of acrylonitrile and has a weight average molecular weight of 55,000. The extruder feed consists of 84 parts of polymer, 16 parts of water, 7 parts of N-vinylpyrrolidone, 7 parts of N-vinylcaprolactam and 0.5 part of tertiary butyl peroxy benzoate. The temperature at the spinneret is 175° C. The resulting fiber is transparent, stable to steam relaxation and boil-off, has a hot-wet modulus greater than 1.0 gram/denier and is dyeable at the boil. Conventional fibers from homopolymers of acrylonitrile are not dyeable at the boil.

COMPARATIVE EXAMPLE C

The procedure of Example 1 is again followed except that the extruder feed consists of 84 parts of the polymer used in Example 1, 16 parts of water, 6 parts of acrylonitrile and 0.2 part of 1,1-ditertiary butyl-3,3,5-trimethyl cyclohexane. The resulting fiber although initially transparent is not stable to steam relaxation or boil-off and becomes opaque when subjected to these operations. The fiber has a somewhat higher hot-wet modulus than that of Comparative Example A, thus indicating that the polymer forming the fiber has an increased acrylonitrile content. The use of acrylonitrile in the fusion melt lowers the melting point of the melt.

EXAMPLE 4

The procedure of Example 1 is again followed except that the extruder feed consists of 84 parts of the acrylonitrile polymer of Example 1, 16 parts of water, 6 parts of N-vinyl-N-methyl acetamide, 2 parts of vinyl methyl ether and 0.3 part of tertiary butyl peroxy benzoate. The resulting fiber is transparent and its transparent structure is stable to steam relaxation and boil-off.

EXAMPLE 5

The composition of Example 1 is fed to an extruder as in Example 1 and extruded into the steam-pressurized solidification zone through a circular film-forming die opening of 20 mils. The tubular film is drawn down by draw rolls at a stretch ratio of 2 relative to the linear flow of melt through the spinneret and the tube is inflated by air blown into the tubular structure at a pressure to cause a lateral expansion factor of 2. The resulting biaxially oriented tube is flattened while inside the solidification zone and removed therefrom by means of a roll seal which also provides the longitudinal stretch. The exited flattened tube is then slit on one side, opened to form a single thickness of film and dried under tension on a tenter frame in an oven at a dry-bulb temperature of 110° C. and a wet-bulb temperature of 65° C. The resulting film is transparent and its transparency is stable to hot-wet processing. The film readily receives printing applied thereon.

EXAMPLE 6

The procedure of Example 1 is again followed except that the extruder feed consists of 85 parts of the acrylonitrile polymer of Example 1, 15 parts of water, 6 parts of N-vinyl pyrrolidone, 4 parts of methyl methacrylate and 0.4 part of tertiary butyl peroxy benzoate. The resulting fiber is clear and its transparency is stable to steam relaxation and boil-off. Furthermore, the fiber has a silky appearance. It is believed that the silky appearance is due to the fact that some methyl methacrylate polymer remains dispersed as a separate phase within the polymer-water melt, and is elongated during stretching employed in the extrusion process.

I claim:

1. A process for preparing a substantially transparent shaped article from a hydrophobic fiber-forming acrylonitrile polymer which comprises preparing in a compacting and melting zone a fusion melt of about 70 to about 90 parts of a hydrophobic fiber-forming acrylonitrile polymer, from about 10 to about 30 parts of water, from about 3 to about 25 parts of an N-vinylamide which is water-soluble below 120° C. and uniformly distributed in said melt an effective amount of a polymerization initiator, said melt being at a temperature above the boiling point of water at atmospheric pressure, and at a pressure sufficient to maintain water in liquid state, the amounts of polymer and water in said melt being such that they form a single phase melt; converting a major portion of the monomer content to polymer while said melt remains within said compacting and melting zone; extruding the polymerized melt through a spinneret directly into a steam-pressurized solidification zone maintained under conditions of saturation, and at a pressure and temperature that control the rate of release of water from the nascent extrudate and maintain said extrudate in stretchable state; stretching said extrudate while it remains within said solidification zone to provide polymer orientation; exiting said stretched extrudate into the atmosphere; and drying the resulting extrudate at a dry-bulb temperature in the range of about 110° C. to 180° C. and at a wet-bulb temperature in the range of about 60° C. to 100° C.

2. The process of claim 1 wherein said melt is extruded through a fiber-forming spinneret.

3. The process of claim 1 wherein said melt is extruded through a film-forming die.

4. The process of claim 2 wherein said dried extrudate is relaxed in steam to provide fiber shrinkage of about 15% to 40%.

* * * * *